United States Patent
So et al.

(10) Patent No.: US 6,957,306 B2
(45) Date of Patent: Oct. 18, 2005

(54) SYSTEM AND METHOD FOR CONTROLLING PREFETCHING

(75) Inventors: Kimming So, Palo Alto, CA (US); Chengfuh Jeffrey Tang, Saratoga, CA (US); Eric Tsang, Milpitas, CA (US)

(73) Assignee: Broadcom Corporation, Irvine, CA (US)

(*) Notice: Subject to any disclaimer, the term of this patent is extended or adjusted under 35 U.S.C. 154(b) by 272 days.

(21) Appl. No.: 10/294,539

(22) Filed: Nov. 14, 2002

(65) Prior Publication Data

US 2004/0049641 A1 Mar. 11, 2004

Related U.S. Application Data (60) Provisional application No. 60/409,256, filed on Sep. 9, 2002, provisional application No. 60/409,240, filed on Sep. 9, 2002, and provisional application No. 60/409,361, filed on Sep. 9, 2002.

(51) Int. Cl.[7] .............................................. G06F 12/00
(52) U.S. Cl. ........................ 711/137; 711/156; 711/118
(58) Field of Search ................................ 711/137, 156, 711/118, 138, 139

(56) References Cited

U.S. PATENT DOCUMENTS

| | | | | |
|---|---|---|---|---|
| 5,784,711 A | * | 7/1998 | Chi | ............................. 711/213 |
| 6,131,145 A | * | 10/2000 | Matsubara et al. | ......... 711/137 |
| 6,460,115 B1 | * | 10/2002 | Kahle et al. | ................. 711/122 |
| 6,574,712 B1 | * | 6/2003 | Kahle et al. | ................. 711/137 |

OTHER PUBLICATIONS

F. Dahlgren & Per Stenstrom, "Effectiveness of Hardware–Based Stride and Sequential Prefetching in Shared–Memory Multiprocessors," Proceeding of 1st IEEE Symposium on High–Performance Computer Architecture IEEE, Raleigh, North Carolina, 1995, pp. 68–77.*

Tien–Fu Chen, "An Effective Programmable Prefetch Engine for On–Chip Caches," 1995 IEEE Proceedings of MICRO–28, pp. 237–242.*

Steven P. VanderWiel & David J. Lilja, "When Caches Aren't Enough: Data Prefetching Techniques," IEEE Computer Magazine, Jul. 1997, pp. 23–30.*

Jim Handy, "The Cache Memory Book: the authoritative reference on cache design," Academic Press, $2^{nd}$ Edition, 1998, pp. 57–68.*

* cited by examiner

*Primary Examiner*—Pierre Michel Bataille
*Assistant Examiner*—Sheng-Jen Tsai
(74) *Attorney, Agent, or Firm*—McAndrews, Held & Malloy, Ltd.

(57) ABSTRACT

Systems and methods that control prefetching are provided. In one embodiment, a system may include, for example, a prefetch buffer system coupled to a processing unit and to a memory. The prefetch buffer system may include, for example, a prefetch controller that is adapted to be programmable such that prefetch control features can be selected.

27 Claims, 4 Drawing Sheets

SYSTEM AND METHOD FOR CONTROLLING PREFETCHING

RELATED APPLICATIONS

This application makes reference to, claims priority to and claims benefit from U.S. Provisional Patent Application Ser. No. 60/409,256, entitled "System and Method for Controlling Prefetching," filed on Sep. 9, 2002; U.S. Provisional Patent Application Ser. No. 60/409,240, entitled "System and Method for Caching," filed on Sep. 9, 2002; U.S. Provisional Patent Application Ser. No. 60/409,361, entitled "System and Method for Directional Prefetching," filed on Sep. 9, 2002.

INCORPORATION BY REFERENCE

The above-referenced United States patent applications are hereby incorporated herein by reference in their entirety.

BACKGROUND OF THE INVENTION

In many fields and applications, a control processor (e.g., central processing unit (CPU)) shares a memory with multiple devices via a memory controller. The CPU may, for example, handle interrupts, manage other functional resources and interact with users. To perform these tasks in a timely manner, the execution speed of the CPU is a substantial factor with respect to the overall system performance. Memory latency, in turn, is a substantial factor with respect to the execution speed. Unlike media processors, for example, that access memory in long data streams, the CPU may tend to access short streams of sequencing addresses. It is difficult to build a shared memory system that satisfies these different types of requests. Thus, the memory latency of the CPU may be long (e.g., tens of cycles) even if the memory bandwidth is high.

One solution to the memory latency problem employs the technique of prefetching. Prefetching may include, for example, loading particular data to storage close to the CPU in anticipation that the CPU may use the data in the near future. However, the coverage and accuracy of a particular prefetching scheme can vary with different programs and applications. In addition, the effectiveness of a particular prefetching scheme can even vary with respect to the memory region being accessed by the CPU. In fact, there are some circumstances in which a particular prefetching scheme would be more effective if it were turned off. However, conventional prefetching schemes and controls may not be changed in real time (i.e., on the fly) to accommodate dynamic environments.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found, for example, in systems and methods that control prefetching. In one embodiment, the present invention may provide a system that controls prefetching and may include, for example, a prefetch buffer system coupled to a processing unit and to a memory. The prefetch buffer system may include, for example, a prefetch controller that is adapted to be programmable such that prefetch control features can be selected.

In another embodiment, the present invention may provide a method that controls a prefetch buffer system. The method may include one or more of the following: programming values into particular registers of the prefetch buffer system; selecting particular prefetch scheme features based upon the programmed values in the particular registers; and performing a particular prefetch scheme according to the selected particular prefetch scheme features.

In yet another embodiment, the present invention may provide a method that switches between prefetching schemes. The method may include one or more of the following: performing a first prefetching scheme; writing values into particular registers of a prefetch buffer system; and switching to a second prefetching scheme based on the values written into the particular registers of the prefetch buffer system.

In still yet another embodiment, the present invention may provide a system that controls a prefetch buffer system. The system may include, for example, a processor coupled to one or more control registers of the prefetch buffer system. At run time, software being executed by the processor may change prefetching features of the prefetch buffer system.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
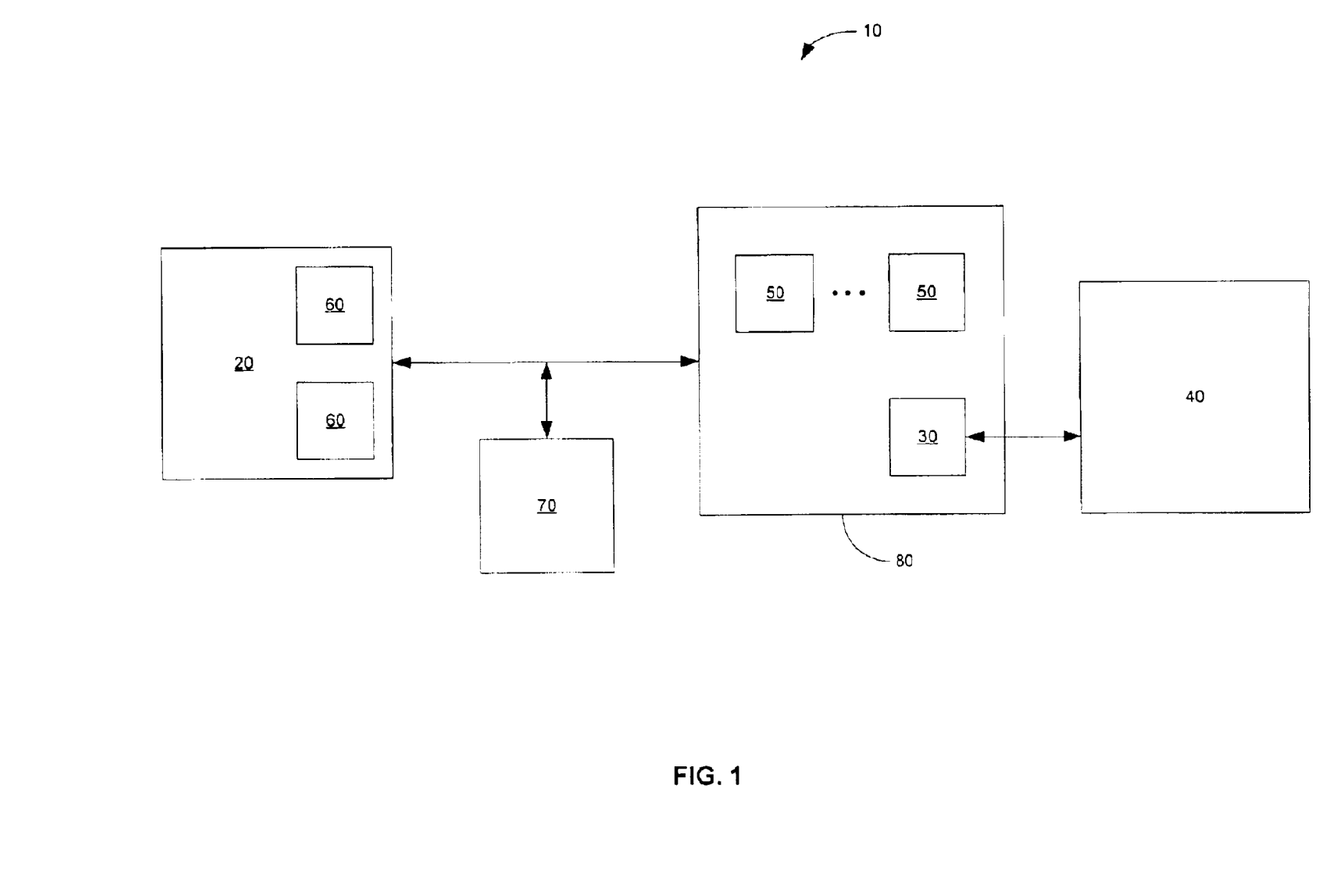
FIG. 1 shows a block diagram illustrating an embodiment of a system that caches data streams according to the present invention.

FIG. 1 shows a block diagram illustrating an embodiment of a system that controls prefetching according to the present invention. The system 10 may include, for example, a central processing unit (CPU) 20, a prefetch buffer system 70, a system interconnect and memory controller (SIMC) 80 and a memory 40. The CPU 20 may also include, for example, a cache 60. The cache 60 may include one or more cache, for example, a level one (L1) cache and a level two (L2) cache which may store cache lines. The SIMC 80 may include, for example, a memory controller 30 and other system functional units 50. The memory controller 30 may include, for example, a memory scheduler (not shown). The CPU 20 may be coupled to the SIMC 80 which, in turn, may be coupled to the memory 40 via, for example, the memory controller 30. The prefetch buffer system 70 may be coupled both to the CPU 20 and to the SIMC 80. In one example, the prefetch buffer system 70 may be closer to the CPU 20 than the memory 40 and may be coupled, for example, to a bus, which may couple the CPU 20 to the SIMC 80. However, the prefetch buffer system 70 may be in communications with the CPU 20 and the SIMC 80 using other communication means.

The prefetch buffer system 70 may include, for example, a cache or a buffer. In one embodiment, the prefetch buffer system 70 may include a prefetch buffer (e.g., a spatial cache, a fully functional cache, a buffer, etc.) The prefetch buffer system 70 may also include, for example, a set of controls that may be adapted to prefetch streams of data into the prefetch buffer system 70 to reduce the memory latency of the CPU 20. The set of controls may be adapted to be programmable such that particular prefetch features or schemes may be, for example, enabled, disabled or selected. In one example, when a particular prefetch scheme becomes ineffective or less effective for a particular environment, then the set of controls of the prefetch buffer system 70 may be programmed and implemented in real time (e.g., on the fly).

In one embodiment, software running, for example, at least in part, in the CPU 20 may access the prefetch buffer system 70 to enable, disable or select particular prefetch features or schemes by changing values stored in the prefetch buffer system 70. The enabling, disabling or selecting may occur during, for example, the normal operation of the CPU 20. For example, the CPU 20 may monitor the effectiveness of a particular prefetch scheme and, to improve the effectiveness of the prefetch scheme, may select a new prefetch scheme that is supported by the prefetch buffer system 70. The set of controls may also be adapted to be programmable such that the contents stored in the prefetch buffer system 70 (e.g., in a prefetch buffer of the prefetch buffer system 70) may be manipulated. For example, values may be written into the set of controls which invalidate one or more blocks stored in the prefetch buffer system 70.

The prefetch buffer system 70 may be adapted to send one or more kinds of block requests to the memory 40. A block may include a single cache line or a plurality of cache lines. The prefetch buffer system 70 may be adapted to request a missing block from the memory 40 when, for example, a CPU cache line miss (i.e., the CPU 20 was unable to find a particular cache line in its cache 60) also misses the prefetch buffer system 70. The prefetch buffer system 70 may also request a prefetch block from the memory 40 when, for example, a particular block is determined by the prefetch buffer system 70 to be needed by the CPU 20 ahead of the actual need of the CPU 20. A request for a prefetch block may be generated by the prefetch buffer system 70 regardless of whether or not the CPU 20 may find the missing cache line in the prefetch buffer system 70. A request for a particular prefetch block might not be generated if the particular prefetch block already resides in the prefetch buffer system 70.

Figure 2A:
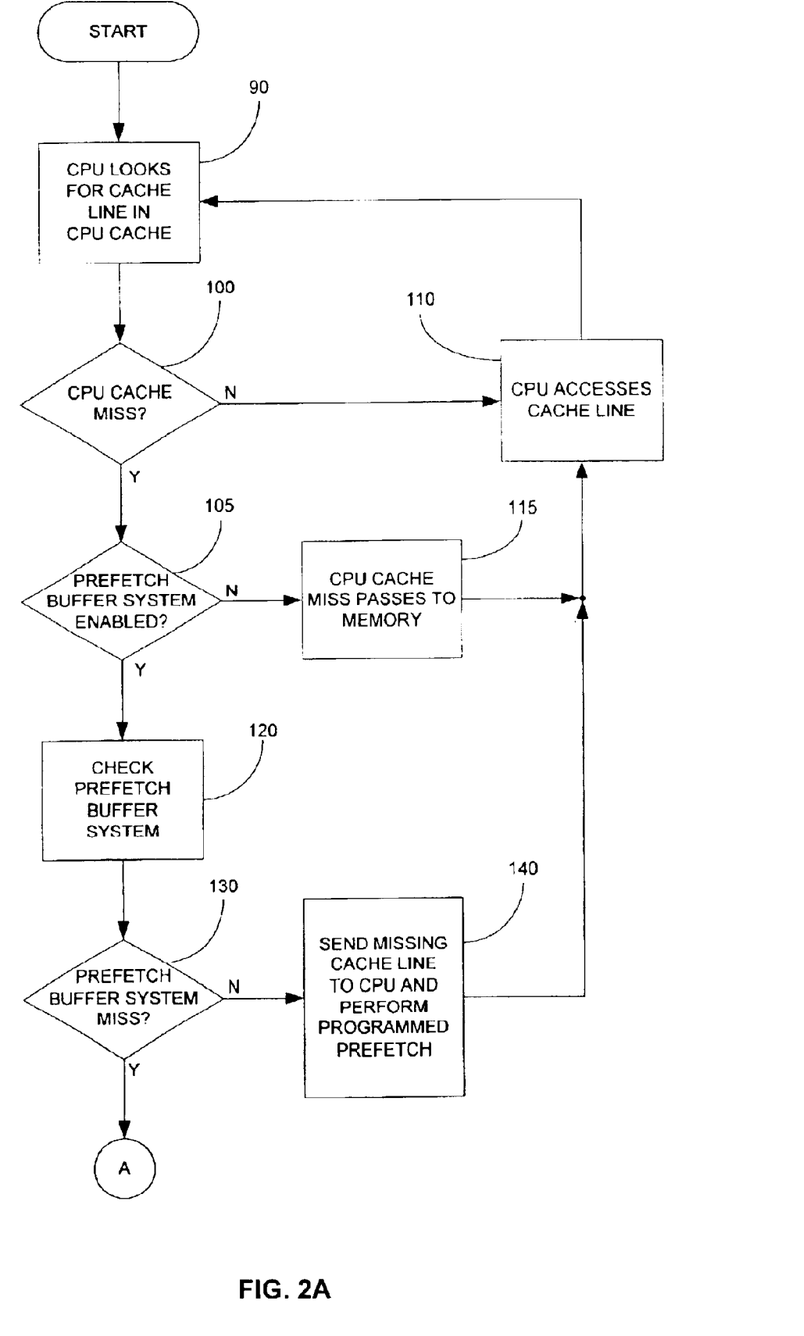
FIGS. 2A–B show a flowchart illustrating an embodiment of a process that controls prefetching when a central processing unit (CPU) attempts to access a particular cache line according to the present invention.
Figure 2B:
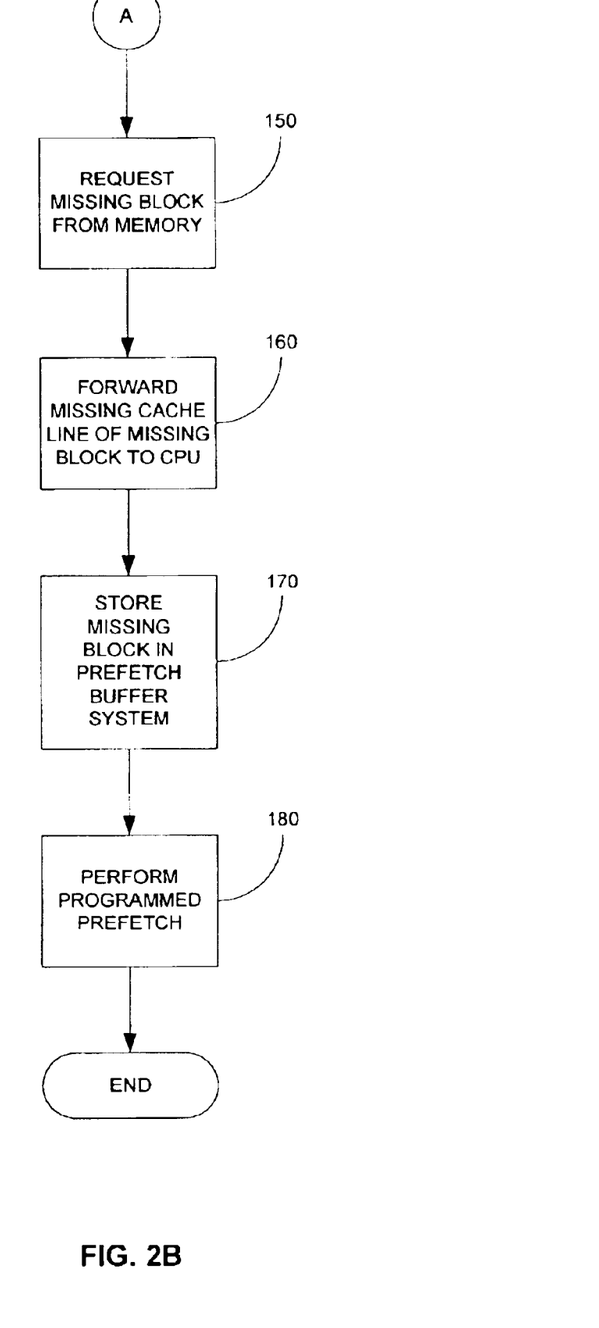

FIGS. 2A–B show a flowchart illustrating an embodiment of a process that controls prefetching when the CPU 20 attempts to access a particular cache line according to the present invention. In step 90, the CPU 20 may be looking for a particular cache line (e.g., data in a particular cache line) of the CPU cache 60. In query 100, it may be determined whether the particular cache line is presently in the CPU cache 60. If the particular cache line is presently stored in the CPU cache 60 (i.e., if it is not a CPU cache miss), then the CPU may access (e.g., read) the particular cache line in step 110. The process may then, for example, loop back to step 90 in which the CPU 20 may look for a CPU cache line (e.g., another CPU cache line). In query 100, if the particular cache line is not presently stored in the CPU cache 60 (i.e., if it is a CPU cache miss), then, in query 105, it may be determined whether the prefetch buffer system 70 is enabled.

The prefetch buffer system 70 may be programmed by the software to be in a disabled mode. If the prefetch buffer system 70 is in a disabled mode (i.e., it is not enabled), then, in step 115, the CPU cache miss may be passed on to the memory 40 via the memory controller 30. The memory 40 may then directly provide the missing cache line or missing block to the CPU 20. In step 110, the CPU may access the cache line and, in step 90, the CPU 20 may look for another cache line as described above. If the prefetch buffer system 70 is enabled, then, in step 120, the CPU 20 may check the prefetch buffer system 70.

In query 130, it may be determined whether the particular cache line is residing in the prefetch buffer system 70. If the particular cache line is presently stored in the prefetch buffer system 70 (i.e., if it is not a prefetch buffer miss), then, in step 140, the prefetch buffer system 70 may send the particular cache line to the CPU 20 and possibly perform a programmed prefetch based on, for example, information relating to the cache line requested by the CPU 20. In a prefetch, the prefetch buffer system 70 may request a prefetch block or a prefetch cache line from the memory 40 and may store the prefetch block or the prefetch cache line in, for example, a prefetch buffer of the prefetch buffer system 70. The type of prefetch scheme or the parameters related to a particular prefetch scheme may be programmed and stored in the set of controls of the prefetch buffer system 70. Software may program the prefetch buffer system 70 to perform different prefetch schemes or variations of some prefetch schemes. The process may, for example, loop back to step 110 in which the CPU 20 may access the cache line received from the memory 40 or the prefetch buffer system 70 and, in step 90, may look for a cache line (e.g., another cache line) in the CPU cache 60. The prefetch request in step 140 need not be received by the memory 40 or be completed before the start of step 110 in the loop back to step 90.

In query 130, if the particular cache line is not presently stored in the prefetch buffer system 70 (i.e., if it is a prefetch buffer miss), then, in step 150, the prefetch buffer system 70 may request a missing block from the memory 40. The requested missing block may include a single cache line (e.g., the particular cache line that was missed) or a plurality of cache lines including the particular cache line that was missed. In one example, in step 160, the prefetch buffer system 70 may receive the requested missing block and may forward the particular cache line of the requested missing block to the CPU 20. In another example, the particular cache line of the requested missing block may be directly forwarded to the CPU 20. In step 170, the prefetch buffer system 70 may store the entire missing block or just the remaining data (e.g., the cache lines other than the particular cache line) of the requested missing block in the prefetch buffer system 70 (e.g., in a prefetch buffer). In step 180, the prefetch buffer system 70 may perform a programmed prefetch based on, for example, information relating to the cache line requested by the CPU 20 or information relating to the requested missing block. The type of prefetch scheme or the parameters related to a particular prefetch scheme may be programmed and stored in the set of controls of the prefetch buffer system 70. Software may program the prefetch buffer system 70 to perform different prefetch schemes or variations of some prefetch schemes. The software may program differently in different prefetching environments. The prefetch request may include requesting a prefetch block which may include a single cache line or a block request including a plurality of cache lines. In one example, when the prefetch buffer system 70 has generated a missing block request and a prefetch block request, the prefetch buffer system 70 may give priority to the missing block request and send the missing block request before the prefetch block request to the memory controller 30. In one example, the prefetch buffer system 70 may not generate a prefetch block request if the requested prefetch block already resides in the prefetch buffer system 70.

Figure 3:
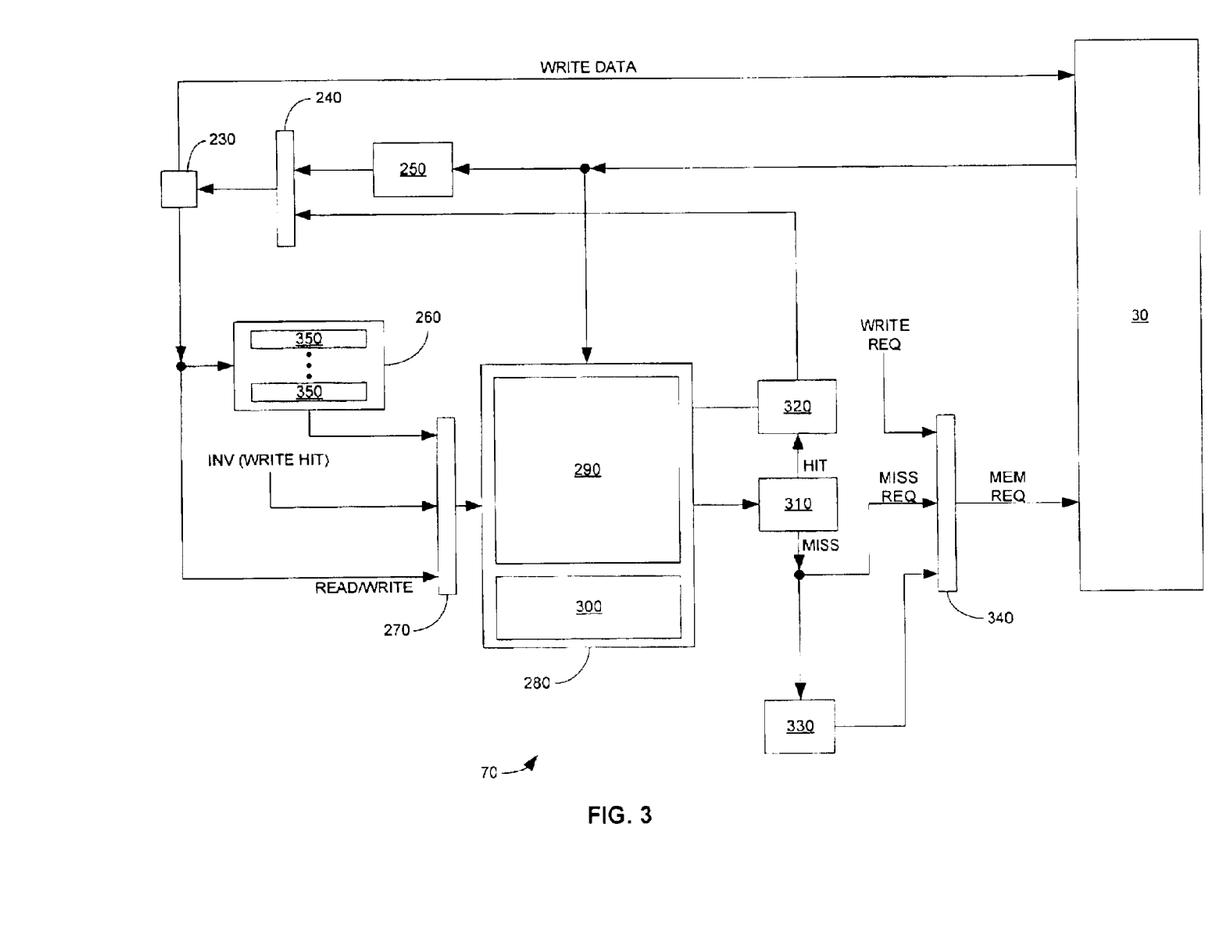
FIG. 3 shows an embodiment of a prefetch buffer system according to the present invention.

FIG. 3 shows an embodiment of a prefetch buffer system 70 according to the present invention. The prefetch buffer system 70 may be coupled, for example, to the memory controller 30 of the SIMC 80. The prefetch buffer system 70 may include, for example, a CPU interface 230, a selector 240, a read buffer 250, a prefetch controller 260, a selector 270, a prefetch buffer 280, a decision block 310, a buffer 320, a prefetch request buffer (PRB) 330 and a selector 340. The prefetch controller 260 may include, for example, prefetch control registers (PCRs) 350. The components may be coupled as illustrated in FIG. 3. However, some couplings have not been illustrated. For example, the CPU interface 230 may be coupled to the CPU 20 or to a bus that is coupled to the CPU 20. The memory controller 30 may be coupled, for example, to the memory 40 and to other functional devices 50.

The prefetch buffer 280 may include, for example, a data array 290 and a directory 300 (e.g., a tag array). The data array 290 may be adapted to store data prefetched from the memory 40. The data array 290 may be arranged into blocks in which each block may store a single cache line or multiple cache lines. In one example, the data array 290 and the directory 300 may be configured as a fully-functional cache (e.g., an L2 cache). In another example, the line size of an L1 cache in the CPU 20 may be 32 bytes and the block size of the prefetch buffer 280 may be 128 bytes. Thus, each block of the prefetch buffer 280 may store four cache lines. The directory 300 may be adapted to store the addresses of the data. Each entry in the directory 300 may include, for example, a block address and several valid bits. In one example, each valid bit may correspond to each unit of cache line belonging to the same block. The block may be invalidated if, for example, all of its corresponding valid bits are in an off state. An invalidated block may become a candidate location for refilling prefetched data. In one example, an invalidated block may be an indication of a preferred location for refilling prefetched data.

The prefetch controller 260 may include, for example, one or more PCRs 350 (e.g., memory-mapped registers). A PCR 350 may be accessed by the CPU 20 through, for example, load and store instructions. A special physical address may be allocated for each PCR 350 and the location may not fall in any cacheable memory segment of the CPU 20.

The control of the operations of the prefetch buffer system 70 including, for example, the prefetch buffer 280 may be set or reset at run time (e.g., during system initialization or other run times), for example, by software through the use of a programmable prefetch controller 260. For clarity, each PCR 350 will be referenced by a respective address: PCR-0, PCR-1, PCR-2, PCR-3 and PCR-4. Although discussed with respect to the below-method five PCRs, the present invention also contemplates using a different number of PCRs. For example, there may be more or less than five PCRs with more or less than five PCR addresses. In addition, the present invention may include one or more of the programmable prefetch features discussed below. The present invention also may contemplate controlling other aspects or features of the prefetch buffer system 70 that may be known to one of ordinary skill in the art, although not explicitly described herein.

The prefetch buffer system 70 may be disabled or enabled according to a value programmed into, for example, the first register PCR-0 of the prefetch controller 260. For example, if the value 0 is stored in the register PCR-0, then the prefetch buffer system 70 may be in a disabled mode. A CPU read may then pass through the prefetch buffer system 70 to the memory controller 30. The requested data may be provided directly by the memory 40 to the CPU 20 via the memory controller 30. If the value 1 is stored in the register PCR-0, then the prefetch buffer system 70 may be in a no-prefetch mode. In the no-prefetch mode, the prefetch buffer system 70 may only refill a block when it is missing, but may not prefetch additional blocks. In one example, if the block may include a plurality of cache lines including the missing cache line, then the prefetch buffer system 70 may only refill the block into the prefetch buffer 280, but may not prefetch additional blocks. If the value 2 is stored in the register PCR-0, then the prefetch buffer system 70 may be in an active prefetch mode. The prefetch buffer system 70 may employ, for example, a default prefetch scheme or other prefetch scheme. For example, if, due to a CPU 20 request to the prefetch buffer system 70, a missing block is refilled into the prefetch buffer 280, then the prefetch controller 260 may cause the prefetch buffer system 70 to prefetch an additional block according to a particular prefetch scheme.

A second register PCR-1 of the prefetch controller 260 may be used in selecting a particular type of prefetching scheme if the prefetch buffer system 70 is in active prefetch mode (i.e., PCR-0=2). The prefetch controller 260 may provide a selection of different prefetching schemes as well as variations of particular prefetching schemes from which the software may choose. Writing a value to register PCR-1 may indicate to the prefetch controller 260 to switch to a particular predefined prefetch scheme or to switch to a variation of a particular prefetch scheme. For example, if the value 0 is stored in the register PCR-1, then the prefetch scheme may be a sequential prefetch. If the CPU 20 requests block b such that block b may be brought into the prefetch buffer 280, then the prefetch controller may control the prefetch buffer system 70 to prefetch the next sequential block (e.g., block b+1) into the prefetch buffer 280. If the value 1 is stored in the register PCR-1, then the prefetch scheme may perform strides or jumps. For example, if the CPU 20 accesses block b, then the prefetch controller 260 may cause the prefetch buffer system 70 to prefetch block b+4. The stride number may be changed and stored in another PCR so that the prefetch scheme may easily be adapted (e.g., at run time) according to the circumstance. If the value 2 is stored in the register PCR-1, then the prefetch scheme may be a backwards sequential prefetch scheme. For example, if the CPU 20 accesses block b, then the prefetch controller 260 may cause the prefetch buffer system 70 to prefetch block b−1. If the value 3 is stored in the register PCR-1, then the prefetch scheme may be a backwards prefetch scheme with a particular backwards stride or jump. The prefetch controller 260 may be made to perform other types of prefetch schemes or variations of those schemes by storing other values in the register PCR-1.

The software may manipulate the contents of the prefetch buffer 280 by manipulating the contents of the registers of the prefetch controller 260. For example, if the value 1 is stored in the register PCR-2 of the prefetch controller 260 (e.g., the software writes the value 1 into register PCR-2), then the prefetch controller 260 may invalidate all of the blocks in the prefetch buffer 260. If the prefetch buffer contains no modified data, then the invalidation may be accomplished in one cycle or, at the most, a very few cycles. In another example, if a particular address is stored in the register PCR-3, then the prefetch controller 260 may invalidate the block in the prefetch buffer 280 with a tag ID that is the same as the block tag associated with the address.

The software may also control the scope of a particular prefetch scheme by writing a particular value in the register PCR-4 of the prefetch controller 260. For example, if the value 0 is stored in the register PCR-4, then every block under the prefetch scheme selected according to register PCR-1 may be prefetched. If the value 1 is stored in the register PCR-4, then only CPU instruction misses may be prefetched. An additional CPU signal may be employed on the CPU bus to indicate if a CPU request is for instructions or is for data. If the value 2 is stored in the register PCR-4, then the prefetch scheme may only be active if a CPU 20 access falls within a particular range of addresses. The range may be defined by parameters stored in other PCRs. If the value 3 is stored in the register PCR-4, then, in addition to the prefetches defined under PCR-4=0, the prefetch scheme may also prefetch blocks in the non-cacheable memory segments of the CPU 20 to the prefetch buffer 280. If the blocks of the prefetch buffer 280 are shared with other devices in the system, then the blocks may be easily invalidated with programmable control as described above.

The PRB 330 may be adapted to store memory requests that are waiting to be sent or that have been sent but not yet completed. The memory requests may include, for example, block address information. Status bits may be used to indicate, for example, a valid request, a prefetch block request, a missing block request, a request already sent to memory, etc. The PRB 330 may include, for example, one or more data structures. In one embodiment, the PRB 330 may include a first data structure (e.g., a queue) that may store missing block requests and a second data structure (e.g., a stack) that may store prefetch block requests. The capacity of the PRB 330 may be determined, for example, by the maximum number of CPU misses that the prefetch controller may support. A data structure may include one or more last-in-first-out (LIFO) buffers, first-in-first-out (FIFO) buffers or any other type of buffers. The PRB 330 may also employ a single data structure that may store both missing block requests and prefetch block requests.

In operation, a CPU access may cause a look up in the prefetch buffer 280. A CPU read request may be generated in response, for example, to an L1 cache miss or a non-cacheable read. In one example, the CPU cache miss may result in a look up in the prefetch buffer 280 (assuming that the prefetch buffer system 70 has not been programmed into a disabled mode). The prefetch buffer system 70 may be programmed such that non-cacheable read requests may be directly provided by the memory 40. In another example, the prefetch buffer 280 may stage non-cacheable data as long as the software knows how to maintain the data coherency among the devices accessing the memory 40.

The look up in the prefetch buffer 280 may be passed from the CPU buffer 230 to the prefetch controller 260. The prefetch controller 260 may determine whether or not the prefetch buffer 280 contains the missing CPU cache line. The prefetch controller 260 may, via the selector 270, use address information from the directory 300 in determining whether or not the missing cache line is present in the data array 290. If the missing cache line is present in the data array 290, then the decision block 310 may determine that it is a prefetch buffer hit and may send the missing cache line to the CPU 20 via the buffer 320, the selector 240 and the CPU interface 230. In one embodiment, once the particular cache line in the data array 290 has been sent to the CPU 20, then the particular cache line in the data array 290 may be invalidated.

In addition to sending the missing CPU cache line to the CPU 20, depending upon its programming, the prefetch buffer system 70 may also generate a prefetch request in light of information concerning the missing cache line. For example, the prefetch buffer system 70 may check whether or not the next sequential block before or after the block containing the missing cache line resides in the prefetch buffer 280. If it does not, then the prefetch buffer system 70 may generate a prefetch request (e.g., in the prefetch controller 260 or in the PRB 330) and store it in PRB 330. The prefetch request may be transmitted to the memory controller 30 via the selector 340. Priority may be given to missing requests over prefetch requests stored in the PRB 330.

If the look up in the prefetch buffer 280 shows that the missing cache line is not in the prefetch buffer 280, then a prefetch buffer miss may have occurred. The prefetch buffer system 70 may then generate a missing block request in which the requested missing block may contain the missing CPU cache line. The missing block request may be stored in the PRB 330 (e.g., in a queue). Since the prefetch buffer system 70 may be able to handle multiple miss requests, a particular missing block request may have to wait for its opportunity in the queue to be transmitted to the memory controller 30 via the selector 340. In addition to the missing block request, depending upon its programming, the prefetch buffer system 70 may also generate a prefetch block request. The prefetch block request may not be generated if the block requested is already residing in the prefetch buffer 280. Alternatively, the prefetch block request may be modified if the block requested is already residing in the prefetch buffer 280. The requested prefetch block may be the next sequential block before or after the block in the missing block request depending upon the programming of the PCRs 350 of the prefetch controller 260. In one example, the prefetch block may be part of a set of blocks (e.g., aligned blocks or other sets of blocks). The memory 40 may be partitioned into sets of blocks. For example, a set of blocks may include block b and block b+1 or block b and block b−1, in which b−1, b and b+1 are block addresses in the memory 40. Thus, the prefetch block request may depend upon which of the blocks in a set of blocks is not the missing block. The prefetch block request may be stored in the PRB 330 (e.g., in a stack). In one example, the prefetch block request may not be sent to the memory controller 30 until the respective memory block request or any memory block request has been completed.

When the memory controller 30 fetches the requested missing block, the missing cache line may be sent to the CPU 20 via the read buffer 250, the selector 240 and the CPU interface 230. The rest of the data in the requested missing block (e.g., the other cache lines in the missing block) may be refilled into the prefetch buffer 280. In one example, the entire missing block is stored in the prefetch buffer 280, however, the cache line used by the CPU 20 (which was also sent directly to the CPU 20) may be invalidated. In another example, the entire missing block may be received by the prefetch buffer system 70 before the missing cache line in the missing block is forwarded to the CPU 20. Then, the prefetch buffer system 70 may remove the missing block request from the PRB 330.

When a prefetched block is received by the prefetch buffer system 70 from the memory 40, the entire prefetched block may be stored in the prefetch buffer 280. Information carried by the prefetch block (or a requested missing block) may be referenced with respect to information stored in the PRB 330. The respective memory request or an entry associated with the respective memory request may be used to determine where in the prefetch buffer 280 to refill the block of data. For example, the PRB 330 may include information relating to the least recently used block that may used to refill the block of data. After storing the data, the PRB entry may be removed.

A CPU write request may also result in a look up request in the prefetch buffer 280. During a write request, a write request and write data may be sent directly to the memory controller 30. However, information about the write request may also be sent to prefetch buffer system 70 which may determine whether or not there is a write hit in the prefetch buffer 280 (i.e., whether the cache line being written to the memory 40 already resides in a block of the prefetch buffer 280). If the cache line resides in the prefetch buffer 280 then, since it may be an older version of the cache line being written to the memory 40, it may be invalidated. The prefetch buffer system 70 may invalidate the cache line or the entire block containing the cache line. The PCRs 350 (e.g., PCR-2 and PCR-3) of the prefetch controller 260 may be programmed, for example, to invalidate all the blocks or particular blocks (e.g., a particular cache line or particular cache lines) in the prefetch buffer 280. If a write miss occurs (i.e., the cache line being written does not reside in the prefetch buffer 280), then the request may be completed. In one embodiment, invalidation is but one programmable option. Other options may include, for example, updating the contents of the line and/or the block stored in the prefetch buffer 280.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for controlling prefetching, comprising:
a prefetch buffer system coupled to a processing unit and to a memory, wherein the prefetch buffer system comprises:
a prefetch buffer; and
a prefetch controller comprising prefetch control registers (PCRs),
wherein:
the PCRs are adapted to be programmable such that prefetch control features can be independently specified;
there is a one-to-one mapping between a PCR, or a portion thereof, and a prefetch control feature; and
a particular one of the PCRs, or a portion thereof, may be programmed with a particular value, thereby causing the prefetch buffer system to manipulate contents stored in the prefetch buffer in a predetermined manner associated with the particular value.

2. The system according to claim 1, wherein a particular one of the PCRs, or a portion thereof, may be programmed with a particular value, thereby causing the prefetch buffer system to operate in a disabled state.

3. The system according to claim 1, wherein a particular one of the PCRs, or a portion thereof, may be programmed with a particular value, thereby causing the prefetch buffer system to operate in a no-prefetch state.

4. The system according to claim 1, wherein a particular one of the PCRs, or a portion thereof, may be programmed with a particular value, thereby causing the prefetch buffer system to operate in an active prefetch state.

5. The system according to claim 1, wherein a particular one of the PCRs, or a portion thereof, may be programmed with a particular value, thereby causing the prefetch buffer system to operate in accordance with a sequential prefetch scheme.

6. The system according to claim 1, wherein a particular one of the PCRs, or a portion thereof, may be programmed with a particular value, thereby causing the prefetch buffer system to operate in accordance with a striding prefetch scheme.

7. The system according to claim 1, wherein a particular one of the PCRs, or a portion thereof, may be programmed with a particular value, thereby causing the prefetch buffer system to operate in accordance with a backward prefetch scheme.

8. The system according to claim 1, wherein a particular one of the PCRs, or a portion thereof, may be programmed with a particular value such that some or all of the contents in the prefetch buffer are invalidated in a pre-determined manner associated with the particular value.

9. The system according to claim 1, wherein a particular one of the PCRs, or a portion thereof, may be programmed with a particular value such that a particular address corresponding to a block stored in the prefetch buffer is invalidated in a pre-determined manner associated with the particular value.

10. The system according to claim 1, wherein a particular one of the PCRs, or a portion thereof, may be programmed with a particular value, thereby causing the prefetch buffer system to narrow a scope of a programmed prefetch scheme.

11. The system according to claim 1, wherein the prefetch controller is programmed by the processing unit as a function of prefetching effectiveness monitored during run-time.

12. The system according to claim 1, wherein the prefetch controller is adapted to switch between predefined selectable prefetch schemes in accordance with programming of the prefetch controller.

13. The system according to claim 1, wherein the prefetch buffer system is adapted to fetch data from memory of the processing unit.

14. The system according to claim 1, wherein the prefetch buffer system can be programmed by software at run time.

15. The system according to claim 1, wherein the prefetch buffer system can be dynamically programmed to select the prefetch control features.

16. The system according to claim 1, wherein a particular one of the PCRs, or a portion thereof, may be programmed with a particular value, thereby causing the prefetch buffer system to perform prefetches in response to at least a first type of CPU miss and to not perform prefetches in response to at least a second type of CPU miss.

17. The system according to claim 1, wherein a particular one of the PCRs, or a portion thereof, may be programmed with a particular value, thereby causing the prefetch buffer system to only perform prefetches in one or more particular memory address ranges.

18. A method for controlling a prefetch buffer system, comprising:
programming a particular value into a particular register of the prefetch buffer system, wherein there is a one-to-one mapping between the particular register, or a portion thereof, and a prefetch control feature;
selecting a particular prefetch scheme characterized, at least in part, by the selected particular prefetch scheme feature; and
invalidating one or more blocks in the prefetch buffer system based, at least in part, upon the programmed value in the particular register of the prefetch buffer system.

19. The method according to claim 18, wherein the one or more invalidated blocks indicate preferred locations that can be refilled.

20. The method according to claim 18, wherein the particular register comprises a prefetch control register.

21. A method for switching between prefetching schemes, comprising:

performing a first prefetching scheme;

writing a value into a particular register of a prefetch buffer system, in which there is a one-to-one mapping between the particular register, or a portion thereof, and a prefetch control feature;

manipulating contents stored in the prefetch buffer in a pre-determined manner associated with the value; and switching to a second prefetching scheme based, at least in part, on the value written into the particular register of the prefetch buffer system.

22. The method according to claim 21, wherein the writing occurs in real time during operation of the prefetch buffer system.

23. The method according to claim 21, wherein the switching occurs in real time during operation of the prefetch buffer system.

24. The method according to claim 21, further comprising determining that the first prefetching scheme is not presently an effective prefetching scheme.

25. The method according to claim 21, wherein the particular register comprises a prefetch control register.

26. A system for controlling a prefetch buffer system, comprising:

a processor coupled to one or more control registers of the prefetch buffer system, wherein there is a one-to-one mapping between a particular control register, or a portion thereof, and a prefetch control feature, wherein, at run time, software being executed by the processor can change prefetching features of the prefetch buffer system by writing one or more values to the one or more control registers, and wherein software being executed by the processor can cause the prefetch buffer system to manipulate contents stored in the prefetch buffer in a predetermined manner associated with a particular value by writing the particular value to a particular control register or a portion thereof.

27. The system according to claim 26, wherein the software can change the prefetching features of the prefetch buffer system by writing one or more values to the one or more control registers.

* * * * *